July 8, 1924.
C. A. SHELTON
1,500,532
TIRE ADAPTER FOR VEHICLE WHEELS
Filed Sept. 27, 1923
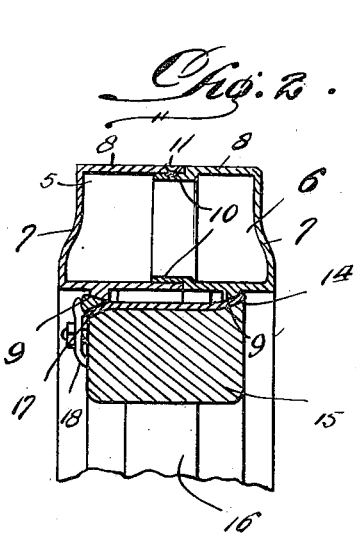
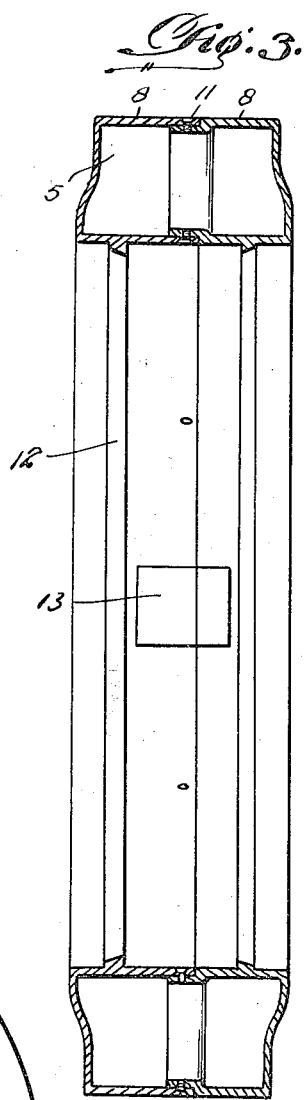
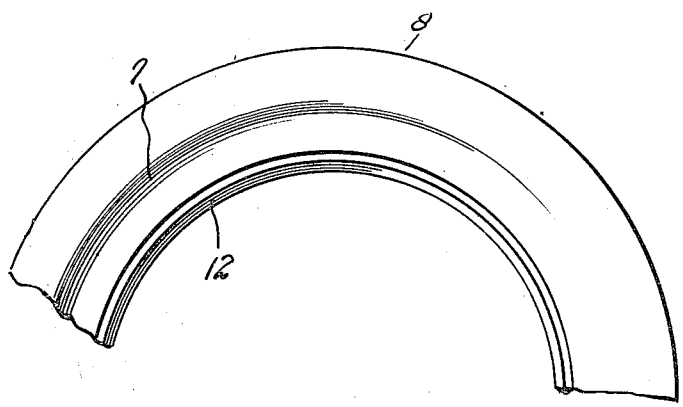
Claude A. Shelton,
Inventor
Witnesses:
By _____, Attorney Patented July 8, 1924.

1,500,532

UNITED STATES PATENT OFFICE.

CLAUDE A. SHELTON, OF MOUNT AIRY, NORTH CAROLINA.

TIRE ADAPTER FOR VEHICLE WHEELS.

Application filed September 27, 1923. Serial No. 665,040.

*To all whom it may concern:*

Be it known that I, CLAUDE A. SHELTON, a citizen of the United States, residing at Mt. Airy, in the county of Surry and State of North Carolina, have invented certain new and useful Improvements in Tire Adapters for Vehicle Wheels, of which the following is a specification.

This invention relates to a tire adapter for vehicle wheels and has more particular reference to a means whereby the usual pneumatic tire carrying wheels of an automobile truck may be adapted to have positioned thereon, tires of a different circumferential size.

Recently automobile trucks have been equipped with wheels adapted for the reception of extremely large and expensive pneumatic tires, this being due to the fact that all of the cushion effect necessary in the operation of a motor truck cannot be attained when these wheels are equipped with cushion tires. However, within the last year there have been tires of the entire cushion type or combination cushion and pneumatic type that are such an improvement over the heretofore cushion tires as to produce all of the cushion effect necessary in the operation of the truck. These new cushion or combined pneumatic and cushion types of tires are considerably less expensive than the pneumatic tires and punctures and blow-outs are effectively dispensed with in the use thereof. However, it is absolutely impossible to apply these new types of tires to the wheels now upon the majority of motor vehicle trucks for numerous reasons such as the unevenness in the metal bands surrounding the periphery of the wheels as well as the relatively small diameter and circumference thereof.

It is therefore the primary object of this invention to provide a means whereby the usual pneumatic tire receiving wheels of motor vehicle trucks may be adapted for the reception of tires having a larger circumferential dimension at their inner periphery.

An additional object is to provide such a tire adapter that is extremely simple of construction and one that may be manufactured and marketed at relatively small cost and one that may be applied to or removed from the usual pneumatic tire receiving wheels in a novel, simple and expeditious manner.

With the above and other objects in view as the nature of the invention is better understood, the same comprises the novel form, combination and arrangement of parts hereinafter more fully described, shown in the accompanying drawing and claimed.

In the drawing wherein like reference characters indicate corresponding parts throughout the several views, Figure 1 is a fragmentary side elevational view of a tire adapter constructed in accordance with the present invention, Figure 2 is a transverse cross section thereof, the same being shown as applied to the fixed rim on the felly of a pneumatic tire receiving truck wheel, and Figure 3 is a vertical transverse sectional view through the entire tire adapter for more clearly disclosing the inner face thereof.

Now having particular reference to the drawing, my novel tire adapter which in reality effects a filling means between a pneumatic tire receiving wheel and a cushion or a combined cushion and pneumatic tire comprises a pair of inter-fitting circular ring elements 5 and 6, respectively. These ring sections 5 and 6 are preferably of a heavy sheet metal and are in cross section of relatively U-shape as clearly shown in Figures 2 and 3 which U-shape affords a side wall 7 and a top and bottom wall 8 and 9 of each of the U-sections respectively.

The top and bottom walls 8 and 9 of the innermost section 6 are formed with extensions 10 that fit within the complementary section 5 as shown in the before mentioned Figures 2 and 3. The extensions 10 are formed at spaced points with screw-threaded openings that register with countersunk openings in the top and bottom walls of the U-shaped sections 5 whereby these sections may be securely joined together through the medium of set screws 11.

Upon the inner surface of this filler element and between circumferential beveled flanges 12 upon the similar surface of said filler is a relatively square-shaped metallic plate 13 that is welded or otherwise suitably secured thereto and is adapted for reception within the usual depression of the metal band 14 upon the felly 15 of the truck wheel 16 for preventing creeping of the filler around the wheel.

In actual practice when it is desired to adapt the wheel 16 for the reception of a cushion or combined cushion and pneumatic tire having a larger internal diameter than the wheel, the usual pneumatic tire is removed therefrom and my adapter positioned thereon as shown in Figures 2 and 3 it being obvious that the circumferential spaced flanges 12 upon the inner surface of the adapter engage the steel band 14 of the felly 15 as shown in Figure 2 after which the usual locking ring 17 may be positioned as shown for co-operation with the usual tire lugs 18 for maintaining this tire adapter in position upon the wheel.

The side walls 7—7 of the sections 5 and 6 are bowed outwardly at their lower edges for overlapping the opposite sides of the felly 15 and for consequently preventing access of mud, dirt and the like, between the adapter and the steel band 14 of the wheel. After this adapter has been positioned, it will of course be manifest that a band carrying the tire may be forced onto the adapter in a manner well known according to the type or make of tire to be used.

From the foregoing it will at once be appreciated by the owners of motor trucks, that I have provided a highly novel and simplified means whereby the usual pneumatic tire receiving wheels of the truck may be adapted for the reception of the less expensive cushion or combined cushion and pneumatic tires having larger circumferential dimensions than the wheel.

Minor changes may be made within the invention without departing from the spirit and scope of the appended claim.

Having thus described my invention, what I claim as new and desire to secure by Letters Patent is:—

An adapter for conversion of a pneumatic tire truck wheel of standard make, having a fixed rim, formed on one side with an annular rib, and on the other side with an inclined abutment for a locking ring, into a non-pneumatic tread wheel, consisting of a pair of rings which are approximately U-shaped in transverse section, and having at their inner sides annular flanges adapted to bear against the opposite side portions of the rim structure, said rings abutting squarely against each other at their inner edges, and one of the rings being provided at its edges with continuous offset flange extensions which enter the other ring, and which bridge the joints along the lines of the abutting edges of the ring.

In testimony whereof I affix my signature.

CLAUDE A. SHELTON.